United States Patent
Zones et al.

(10) Patent No.: US 12,390,800 B2
(45) Date of Patent: Aug. 19, 2025

(54) BORON SSZ-41, ITS SYNTHESIS AND USE

(71) Applicant: Chevron U.S.A. Inc., San Ramon, CA (US)

(72) Inventors: Stacey I. Zones, San Francisco, CA (US); Cong-Yan Chen, Kensington, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 160 days.

(21) Appl. No.: 18/458,226

(22) Filed: Aug. 30, 2023

(65) Prior Publication Data

US 2024/0091750 A1      Mar. 21, 2024

Related U.S. Application Data

(60) Provisional application No. 63/402,820, filed on Aug. 31, 2022.

(51) Int. Cl.
| | | |
|---|---|---|
| *B01J 37/18* | (2006.01) | |
| *B01J 29/70* | (2006.01) | |
| *B01J 29/74* | (2006.01) | |
| *B01J 37/00* | (2006.01) | |
| *B01J 37/03* | (2006.01) | |

(Continued)

(52) U.S. Cl.
CPC ........... *B01J 29/7049* (2013.01); *B01J 29/74* (2013.01); *B01J 37/0018* (2013.01); *B01J 37/031* (2013.01); *B01J 37/04* (2013.01); *B01J 37/08* (2013.01); *C01B 39/04* (2013.01); *C01B 39/12* (2013.01); *C10G 35/095* (2013.01);

(Continued)

(58) Field of Classification Search
CPC .... B01J 29/7049; B01J 29/74; B01J 37/0018; B01J 37/031; B01J 37/04; B01J 37/08; B01J 2229/183; B01J 2235/15; B01J 29/70; B01J 29/86; C01B 39/04; C01B 39/12; C01B 39/48; C10G 35/095; C10G 2300/1044; C01P 2002/72
USPC ................................................... 208/111.15
See application file for complete search history.

(56) References Cited

U.S. PATENT DOCUMENTS

| 5,512,267 A | 4/1996 | Davis et al. |
| 5,591,421 A | 1/1997 | Zones |

(Continued)

FOREIGN PATENT DOCUMENTS

| WO | 2006/060101 A2 | 6/2006 |
| WO | 2024/050393 A2 | 3/2024 |

OTHER PUBLICATIONS

International Preliminary Report on Patentability issued in corresponding PCT/US2023/073133, Mar. 1, 2025.

(Continued)

*Primary Examiner* — Prem C Singh
*Assistant Examiner* — Francis C Campanell
(74) *Attorney, Agent, or Firm* — Erich Joseph Gess; Melissa M. Hayworth; Terrence M. Flaherty

(57) ABSTRACT

A novel synthetic crystalline molecular sieve material, designated boron SSZ-41 is provided. The boron SSZ-41 is a boronzincosilicate molecular sieve having the framework structure of SSZ-41. It can be synthesized using 1,1'-(1,4-butanediyl)bis[4-aza-1-azoniabicyclo[2.2.2]octane] dications as a structure directing agent. The boronzincosilicate SSZ-41 may be used in organic compound conversion reactions and/or sorptive processes.

7 Claims, 1 Drawing Sheet

(51) Int. Cl.
  *B01J 37/04*    (2006.01)
  *B01J 37/08*    (2006.01)
  *C01B 39/04*    (2006.01)
  *C01B 39/12*    (2006.01)
  *C10G 35/095*   (2006.01)

(52) U.S. Cl.
  CPC ..... *B01J 2229/183* (2013.01); *C01P 2002/72* (2013.01); *C10G 2300/1044* (2013.01)

(56) References Cited

U.S. PATENT DOCUMENTS

| | | |
|---|---|---|
| 10,167,200 B2 | 1/2019 | Zones et al. |
| 10,611,645 B2* | 4/2020 | Mowat ................... C01B 37/02 |
| 2007/0128106 A1* | 6/2007 | Burton, Jr. .............. C01B 39/12 |
| | | 423/713 |
| 2015/0078990 A1 | 3/2015 | Elomari |
| 2018/0162738 A1* | 6/2018 | Zones ..................... C01B 39/48 |
| 2022/0288572 A1 | 9/2022 | Zones et al. |

OTHER PUBLICATIONS

International Search Report and Written Opinion issued in corresponding International Patent Application No. PCT/US23/73133, mailed Feb. 15, 2024.

* cited by examiner

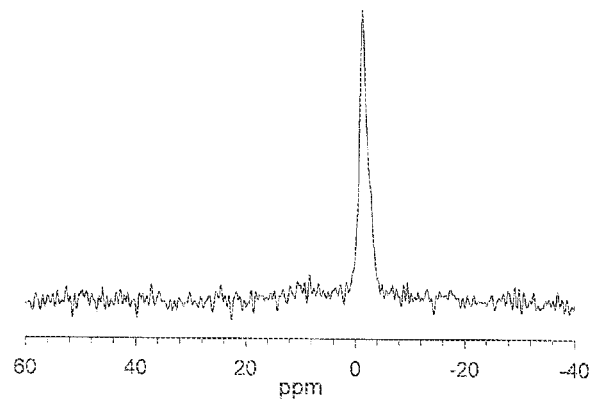

BORON SSZ-41, ITS SYNTHESIS AND USE

CROSS REFERENCE TO RELATED APPLICATIONS

This application claims priority to U.S. Provisional Application Ser. No. 63/402,820 filed Aug. 31, 2022, the complete disclosure of which is incorporated herein by reference in its entirety.

FIELD

This disclosure relates to small crystal size SSZ-41 molecular sieve, its synthesis and its use as an adsorbent and a catalyst for organic conversion reactions.

BACKGROUND

Molecular sieves are a commercially important class of materials that have distinct crystal structures with defined pore structures that are shown by distinct X-ray diffraction (XRD) patterns and have specific chemical compositions. The crystal structure defines cavities and pores that are characteristic of the specific type of molecular sieve.

Providing new molecular sieves that offer differences in the crystal structure as well as the composition can lead to unique catalysts or adsorption/separation materials. Changing a crystal structure is always fraught with difficulties, but success can provide rewards in a new catalyst for organic compound conversion reactions. U.S. Pat. No. 5,591,421 discloses the preparation of SSZ-41. It does not, however, disclose a boron SSZ-41.

SUMMARY

According to the present disclosure, a new crystalline molecular sieve, designated boron SSZ-41 is synthesized using 1,1'-(1,4-butanediyl)bis[4-aza-1-azoniabicyclo[2.2.2]octane] dications as a structure directing agent (SDA). The synthesis has been found to be successful in providing a boron containing molecular sieve, a boronzincosilicate, having the SSZ-41 crystal structure.

In a second aspect, there is provided a method of synthesizing a boronzincosilicate molecular sieve having the framework structure of SSZ-41, the method comprising: (1) forming a reaction mixture comprising: (a) a silicon source such as a FAU framework type zeolite; (b) a source of zinc; (c) a structure directing agent (Q) comprising 1,1'-(1,4-butanediyl)bis[4-aza-1-azoniabicyclo[2.2.2]octane] dications; (d) a source of boron; (e) a source of hydroxide ions; (f) water; and (g) seeds; and (2) subjecting the reaction mixture to crystallization conditions sufficient to form crystals of the boron molecular sieve.

In a third aspect, there is provided a process for converting a feedstock comprising an organic compound to a conversion product, the process comprising the steps of: (i) contacting the feedstock with a catalyst, at organic compound conversion conditions, to produce an effluent containing converted product, the catalyst comprising a boronzincosilicate molecular sieve having the framework structure of SSZ-41; and (ii) recovering converted product from the effluent.

Among other factors, the present process allows one to obtain a boronzincosilicate SSZ-41 molecular sieve. This new molecular sieve prepared by the present process can offer unique abilities as a catalyst in organic compound conversion reactions. The molecular sieve also finds important value as an adsorption/separation material.

BRIEF DESCRIPTION OF THE DRAWING

The FIGURE is a solid state MASNMR of the product of Example 1. The FIGURE shows boron is present in a tetrahedral configuration.

DETAILED DESCRIPTION

Definitions

The term "framework type" has the meaning described in the "*Atlas of Zeolite Framework Types*" by Ch. Baerlocher, L. B. McCusker and D. H. Olsen (Elsevier, Sixth Revised Edition, 2007).

The term "as-synthesized" is employed herein to refer to a molecular sieve in its form after crystallization, prior to removal of the structure directing agent.

The term "anhydrous" is employed herein to refer to a molecular sieve substantially devoid of both physically adsorbed and chemically adsorbed water.

As used herein, the numbering scheme for the Periodic Table Groups is as disclosed in Chem. Eng. News 1985, 63(5), 26-27.

Synthesis of the Boron Molecular Sieve

A boronzincosilicate molecular sieve having the framework structure of SSZ-41 can be synthesized by: (1) forming a reaction mixture comprising: (a) a source of silicon; (b) a source of zinc; (c) a structure directing agent (Q) comprising 1,1'-(1,4-butanediyl)bis[4-aza-1-azoniabicyclo[2.2.2]octane] dications; (d) a source of boron; (e) a source of hydroxide ions; (f) water; and (g) seeds; and (2) subjecting the reaction mixture to crystallization conditions sufficient to form crystals of the boronzincosilicate molecular sieve.

In one embodiment, the silicon source can comprise a FAU framework type zeolite.

The reaction mixture can have a composition, in terms of molar ratios, within the ranges set forth in Table 1:

TABLE 1

| Reactants | Broadest | Secondary |
| --- | --- | --- |
| $SiO_2/B_2O_3$ | ≥10 | ≥15 |
| $SiO_2/Al_2O_3$ | >300 | ∞ (no Al) |
| $SiO_2/ZnO$ | 15 to 75 | 20 to 40 |
| $Q/SiO_2$ | 0.10 to 0.50 | 0.15 to 0.40 |
| $Li/SiO_2$ | 0.05 to 0.35 | 0.10 to 0.30 |
| $OH/SiO_2$ | 0.10 to 0.50 | 0.15 to 0.40 |
| $H_2O/SiO_2$ | 10 to 60 | 15 to 45 | wherein Q comprises 1,1'-(1,4-butanediyl)bis[4-aza-1-azoniabicyclo[2.2.2]octane] dications.

The source of silicon can comprise a FAU framework type zeolite. The FAU framework type zeolite can be zeolite Y. The FAU framework zeolite can be an ammonium-form zeolite or a hydrogen-form zeolite (e.g., $NH_4^+$-form zeolite Y, $H^+$-form zeolite Y). The FAU framework type zeolite can have a $SiO_2/Al_2O_3$ molar ratio of at least 300 (e.g., 300 to 500, 300 to 600). The FAU framework type zeolite can comprise two or more zeolites. Typically, the two or more zeolites are zeolites Y having different silica-to-alumina molar ratios. Examples of suitable aluminosilicate zeolites include Y zeolites CBV720, CBV760, and CBV780, available commercially from Zeolyst International, and Y zeolites HSZ-HUA385 and HSZ-HUA390, available commercially from Tosoh. The FAU framework type zeolite may be used as the sole or predominant source of silicon in the reaction mixture. Sources of silicon with no aluminum can be quite useful. In one embodiment, the source of silicon comprises no Al.

The FAU framework type zeolite can be a zinc-exchanged zeolite (e.g., zinc-exchanged zeolite Y), wherein the zeolite can also be a zinc metal source of the reaction mixture. A "zinc-exchanged zeolite" refers to an aluminosilicate zeolite in which the zinc metal is disposed on the surface of and/or within the cages and/or pores of the aluminosilicate zeolite. It does not refer to aluminosilicates in which the zinc metal is in the aluminosilicate framework.

Additionally or alternatively, the source of zinc can be a zinc salt of an organic or inorganic acid. Representative zinc salts include zinc formate, zinc acetate, zinc citrate, zinc chloride, zinc bromide, zinc nitrate, and zinc sulfate.

If lithium is added, sources of lithium include lithium hydroxide and other lithium salts particularly lithium halides such as lithium chloride.

Suitable sources of boron can include boric acid, which is preferred.

The source of hydroxide ions can be lithium hydroxide. The structure directing agent can also be used to provide hydroxide ion.

The structure directing agent (Q) comprises a 1,1'-(1,4-butanediyl)bis-4-aza-1-azoniabicyclo[2.2.2]octane dication ("[DABCO-(CH$_2$)$_4$-DABCO]$^{2+}$") of the following structure (1):

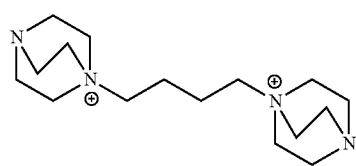

(1)

Suitable sources of Q are the hydroxides, chlorides, bromides, and/or other salts of the diquaternary ammonium compound.

The reaction mixture also contains seeds, typically boronzincosilicate SSZ-41 from a previous synthesis, desirably in an amount of from 0.1 to 20 wt. % by weight (e.g., 0.5 to 10 wt. %) relative to total weight of SiO$_2$ in the reaction mixture. Seeding can be advantageous to improve selectivity for the boronzincosilicate SSZ-41 and/or to shorten the crystallization process. While boron SSZ-41 seeds are preferred, in one embodiment, seeds of prior SSZ-41 zeolite made without boron can be used.

It is noted that the reaction mixture components can be supplied by more than one source. Also, two or more reaction components can be provided by one source. The reaction mixture can be prepared either batchwise or continuously.

Crystallization and Post-Synthesis Treatment

Crystallization of the desired molecular sieve from the above reaction mixture can be carried out under either static, tumbled or stirred conditions in a suitable reactor vessel, such as for example polypropylene jars or Teflon-lined or stainless-steel autoclaves, at a temperature of from 100° C. to 200° C. (e.g., 130° C. to 180° C.) for a time sufficient for crystallization to occur at the temperature used, such as from about 1 day to 14 days (e.g., 3 days to 10 days). Crystallization is usually conducted under pressure in an autoclave so that the reaction mixture is subject to autogenous pressure.

Once the desired molecular sieve crystals have formed, the solid product can be separated from the reaction mixture by standard mechanical separation techniques such as centrifugation or filtration. The recovered crystals are water-washed and then dried, for several seconds to a few minutes (e.g., 5 seconds to 10 minutes for flash drying) or several hours (e.g., 4 hours to 24 hours for oven drying at 75° C. to 150° C.), to obtain the as-synthesized molecular sieve crystals. The drying step can be performed under vacuum or at atmospheric pressure.

As a result of the crystallization process, the recovered crystalline molecular sieve product contains within its pores at least a portion of the structure directing agent used in the synthesis.

The as-synthesized molecular sieve may be subjected to thermal treatment, ozone treatment, or other treatment to remove part or all of the structure directing agent used in its synthesis. Removal of structure directing agent may be carried out using thermal treatment (e.g., calcination) in which the as-synthesized material is heated in an atmosphere selected from air, nitrogen, or a mixture thereof at a temperature sufficient to remove part or all of the structure directing agent. While sub-atmospheric pressure may be used for the thermal treatment, atmospheric pressure is desired for reasons of convenience. The thermal treatment may be performed at a temperature at least 370° C. (e.g., 400° C. to 700° C.) for at least a minute and generally not longer than 20 hours (e.g., 1 to 8 hours).

To the extent desired, any extra-framework metal cations (e.g., Li) in the molecular sieve can be replaced in accordance with techniques well known in the art by ion exchange with other cations. Replacing cations include metal ions, hydrogen ions, hydrogen precursor (e.g., ammonium ions), and mixtures thereof.

Characterization of the Molecular Sieve

In its as-synthesized and anhydrous form, the boronzincosilicate SSZ-41 molecular sieve can have a chemical composition, in terms of molar ratios, within the ranges set forth in Table 2:

TABLE 2

|  | Broadest | Secondary |
| --- | --- | --- |
| SiO$_2$/B$_2$O$_3$ | ≥10 | ≥15 |
| SiO$_2$/Al$_2$O$_3$ | ≥300 | ∞ (no Al) |
| SiO$_2$/ZnO | 15 to 75 | 20 to 40 |
| Q/SiO$_2$ | >0 to 0.1 | >0 to 0.1 | wherein Q comprises 1,1'-(1,4-butanediyl)bis[4-aza-1-azoniabicyclo[2.2.2]octane] dications.

Thus, the composition can be said to comprise the molar relationship of B$_2$O$_3$:(n) (SiO$_2$) with n≥10 in one embodiment, n≥15 in another embodiment, and n ranging from about 15 to 20 in one embodiment.

The molecular sieve boron SSZ-41 has a powder X-ray diffraction (XRD) pattern which, in the as-synthesized form of the molecular sieve, includes at least the peaks listed in Table 3 below and which, in the calcined form of the molecular sieve, includes at least the peaks listed in Table 4 below.

TABLE 3

Characteristic XRD Peaks for As-Synthesized Boron SSZ-41

| 2-Theta [°] | d-Spacing [Å] | Relative Intensity [100 × I/Io] |
|---|---|---|
| 6.71 | 13.16 | S |
| 9.52 | 9.28 | W |
| 20.00 | 4.436 | VS |
| 21.40 | 4.149 | VS |
| 22.19 | 4.003 | S – VS |
| 23.22 | 3.828 | S |
| 24.45 | 3.638 | S – VS |
| 26.07 | 3.415 | M – S |
| 28.01 | 3.183 | M |
| 35.52 | 2.525 | M |

TABLE 4

Characteristic XRD Peaks for Calcined Boron SSZ-41

| 2-Theta [°] | d-Spacing [Å] | Relative Intensity [100 × I/Io] |
|---|---|---|
| 6.82 | 12.95 | VS |
| 9.64 | 9.17 | M – S |
| 20.14 | 4.41 | VS |
| 21.55 | 4.12 | S |
| 22.35 | 3.97 | M |
| 23.38 | 3.80 | M |
| 24.64 | 3.61 | M |
| 26.24 | 3.39 | M |
| 28.18 | 3.16 | M |
| 35.70 | 2.51 | W |

The X-ray diffraction data reported herein were collected by standard techniques using copper K-alpha radiation. The determination of the parameter 2-theta is subject to both human and mechanical error, which in combination can impose an uncertainty of about ±0.10° on each reported value of 2-theta. It is understood that the d-spacing values have a deviation determined based on the corresponding deviation±0.10 degree 2-theta when converted to the corresponding values for d-spacing using Bragg's law. The relative intensities of the lines, I/Io, represents the ratio of the peak intensity to the intensity of the strongest line, above background. The relative intensities are given in terms of the symbols VS=very strong (>60), S=strong (≥40 and ≤60), M=medium (≥20 and <40), and W=weak (<20).

Minor variations in the diffraction pattern can result from variations in the mole ratios of the framework species of the sample due to changes in lattice constants. In addition, disordered materials and/or sufficiently small crystals will affect the shape and intensity of peaks, leading to significant peak broadening. Minor variations in the diffraction pattern can also result from variations in the organic compound used in the preparation. Calcination can also cause minor shifts in the XRD pattern. Notwithstanding these minor perturbations, the basic crystal lattice structure remains unchanged.

INDUSTRIAL APPLICABILITY

Molecular sieve boronzincosilicate SSZ-41 (where part or all of the structure directing agent is removed) may be used as a sorbent or as a catalyst to catalyze a wide variety of organic compound conversion processes. Of particular applicability is use of the boronzincosilicate SSZ-41 in reforming processes.

Catalytic reforming is one of the basic petroleum refining processes for upgrading light hydrocarbon feedstocks, frequently referred to as naphtha feedstocks. Products from catalytic reforming can include high octane gasoline useful as automobile fuel, aromatics (for example benzene, toluene, xylenes and ethylbenzene), and/or hydrogen. Reactions typically involved in catalytic reforming include dehydrocylization, isomerization and dehydrogenation of naphtha range hydrocarbons, with dehydrocyclization and dehydrogenation of linear and slightly branched alkanes and dehydrogenation of cycloparaffins leading to the production of aromatics. Dealkylation and hydrocracking are generally undesirable due to the low value of the resulting light hydrocarbon products.

The boronzincosilicate SSZ-41 catalyst used in reforming reactions would often include a Group VIII metal, such as platinum or palladium, or a Group VIII metal plus a second catalytic metal, which acts as a promoter. Examples of metals useful as promoters include rhenium, tin, tungsten, germanium, cobalt, nickel, rhodium, ruthenium, iridium or combinations thereof. The catalytic metal or metals may be dispersed on a support such as alumina, silica, or silica-alumina.

As in the case of many catalysts, it may be desirable to incorporate the present boronzincosilicate SSZ-41 materials with another material resistant to the temperatures and other conditions employed in organic conversion processes. Such materials include active and inactive materials and synthetic or naturally occurring zeolites as well as inorganic materials such as clays, silica and/or metal oxides such as alumina. The latter may be either naturally occurring, or in the form of gelatinous precipitates or gels, including mixtures of silica and metal oxides. Use of a material in conjunction with boron SSZ-41 (i.e., combined therewith or present during synthesis of the new crystal, which is active) tends to change the conversion and/or selectivity of the catalyst in certain organic conversion processes. Inactive materials suitably serve as diluents to control the amount of conversion in a given process so that products can be obtained in an economic and orderly manner without employing other means for controlling the rate of reaction. These materials may be incorporated into naturally occurring clays (e.g., bentonite and kaolin) to improve the crush strength of the catalyst under commercial operating conditions. These materials (i.e., clays, oxides, etc.) function as binders for the catalyst. It is desirable to provide a catalyst having good crush strength because in commercial use it is desirable to prevent the catalyst from breaking down into powder-like materials. These clay and/or oxide binders have been employed normally only for the purpose of improving the crush strength of the catalyst.

Naturally occurring clays which can be composited with SSZ-41 materials include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with SSZ-41 also include inorganic oxides, such as silica, zirconia, titania, magnesia, beryllia, alumina, and any combination thereof.

In addition to the foregoing materials, the boronzincosilicate SSZ-41 can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia.

The relative proportions of boronzincosilicate SSZ-41 and inorganic oxide matrix may vary widely, with the boronzincosilicate SSZ-41 content ranging from 1 to 90 wt. % (e.g., 2 to about 80 wt. %) of the composite.

The boronzincosilicate SSZ-41 reforming catalyst may be employed in the form of pills, pellets, granules, broken fragments, or various special shapes, disposed as a fixed bed within a reaction zone, and the charging stock may be passed through in the liquid, vapor, or mixed phase, and in either upward, downward or radial flow. Alternatively, the reforming catalysts can be used in moving beds or in fluidized-solid processes, in which the charging stock is passed upward through a turbulent bed of finely divided catalyst. However, a fixed bed system or a dense-phase moving bed system are preferred due to less catalyst attrition and other operational advantages. In a fixed bed system, the feed is preheated (by any suitable heating means) to the desired reaction temperature and then passed into a reaction zone containing a fixed bed of the catalyst. This reaction zone may be one or more separate reactors with suitable means to maintain the desired temperature at the reactor entrance. The temperature must be maintained because reforming reactions are typically endothermic in nature.

The actual reforming conditions often depend, at least in part, on the feed used, whether highly aromatic, paraffinic or naphthenic and upon the desired octane rating of the product and the desired hydrogen production.

EXAMPLES

The following illustrative examples are intended to be non-limiting.

Example 1

Synthesis of a boronzincosilicate SSZ-41 is illustrated. Into the Teflon cup for a Parr 23 ml reactor is added LiOH (anhydrous)=0.05 grams, Zinc acetate dihydrate=0.136 grams, boric acid=0.06 grams, Tosoh HUA 390 (FAU zeolite)=0.90 grams, 3.33 grams of the SDA solution at 1.27M, and 5.25 grams of water. Seeds of prior SSZ-41 zeolite made without boron were added (3% of total $SiO_2$ solids). The ratio of Si/B in this synthesis is about 15. The reaction mix was heated at 160° C. for 10 days with 43 RPM tumbling. The product was a good boronzincosilicate SSZ-41 material. The product analyzed for boron=0.16 wt % Boron. The solid state MASNMR (see FIGURE) demonstrates that boron is present in a tetrahedral configuration, indicative of lattice substitution.

Example 2

Calcination of the Boronzincosilicate SSZ-41

The product from example 1 was calcined in a ramped program to 540° C. under nitrogen sweep, to then remove the SDA. The product retained the XRD pattern of SSZ-41.

Example 3

Exchange of Boron for Aluminum

An exchange experiment was carried out to also demonstrate that the borosilicate product of Example 1 had boron in the framework. 0.4 grams of calcined boronzincosilicate SSZ-41 (Example 2) was placed in a vial and 20 grams of 0.2 Molar solution of aluminum nitrate nonahydrate was added to give an excess of Al over B in the zeolite. The solution was heated without stirring at 95° C. for 4 days. The product was recovered by filtration and first washed with 0.1 HCL solution (to remove any Al still in solution) and then with water. The product is dried and XRD demonstrates no change. Next, the now aluminum-for-boron SSZ-41 is subjected to an acidity test using n-propylamine as adsorbate. The result is that strong acid sites (characteristic of Al in a zeolite lattice) are now observed with a measurement of close to 100 micromoles of ammonia measured at a temperature above 400° C.

Example 4

Platinum Addition

The calcined and ammonium-exchanged zeolite of Example 2 is added (0.63 grams) to 12.9 grams of water with 0.0126 grams of platinum, arising from platinum tetramine chloride hydrate. Stirring is carried for 24 hours at room temperature and then the solids are filtered and calcined to 300° C. Then the solids are pressed and meshed to 24/40 chips and loaded into a reactor.

Example 5

Pretreatment of Catalytic Naphtha Reforming Catalyst

The catalytic naphtha reforming catalyst prepared in Example 4 was sulfided. The sulfiding reactions were conducted in down flow fixed bed reactor systems. The procedure is described as follows:

The catalyst was meshed to 24-40 chips and then loaded into the center of a stainless steel tube reactor. The catalyst (0.53 g dry weight as determined at 1112° F. by TGA (Thermogravimetric Analysis)) was first dried in a $N_2$ flow (300 ml/min) from room temperature to 400° F. at a heating rate of 10° F./min and kept at 400° F. for 30 minutes. For the reduction of the platinum in the catalyst, the catalyst was subsequently heated in a $H_2$ flow (300 ml/min) from 400° F. to 900° F. at a heating rate of 5° F./min and kept at 900° F. for 30 minutes. Finally, the catalyst was cooled down to 800° F. to start the sulfiding reactions.

The feed applied for sulfiding reactions was anhydrous n-octane containing 200 ppm sulfur (as dimethyl disulfide). The sulfiding was carried out at 800° F. and atmospheric pressure for 60 minutes. The $H_2$ and liquid feed flow rates were 30 ml/min and 0.43 ml/min, respectively. After sulfiding, the catalyst was heated in a $H_2$ flow (300 ml/min) from 800° F. to 900° F. within minutes and then at 900° F. for another 30 minutes in order to remove the excess sulfur species occluded in the pores and/or on the surface of the catalyst. Finally, the catalyst was heated up or cooled down to the preset reaction temperature (e.g., 850° F. or 950° F.) within 2 hours in the same $H_2$ flow (300 ml/min) to be ready for starting the catalytic naphtha reforming testing in Example 6.

Example 6

Procedure of Catalytic Naphtha Reforming Testing

After the sulfiding procedure described in Example 5, the catalytic naphtha reforming reactions were conducted as described below.

The catalyst was heated up or cooled down to the preset reaction temperature (950° F. for Example 8) within 2 hours in the same H₂ flow (300 ml/min) to be ready for starting the catalytic naphtha reforming testing in the present example, as described in Example 5. At the same time, the reactor system was pressurized to the preset pressure (150 psig for Example 8). Meanwhile, the H₂ flow was adjusted to the preset rate (14 ml/min for Example 8). The feed rate was 1.55 ml/hour (for Example 8).

In the following example, the catalytic naphtha reforming experiment was carried out at hydrocarbon WHSV of 2.2 and molar ratio of hydrogen to hydrocarbon of 3.0 by using the naphtha feed described in Example 7.

Example 7

Feed for Catalytic Naphtha Reforming Testing

The GC analytical data from the feed used for the catalytic naphtha reforming testing in the present invention are given in Table 5, together with the GC results from Example 8 for its catalytic naphtha reforming testing product over the catalyst described in Example 5. The GC data were acquired via on-line analysis.

Example 8

Product from Catalytic Naphtha Reforming Testing

The GC analytical data from the feed of Example 7, used in the catalytic naphtha reforming testing, are given in Table 5, together with the results from the present example for its catalytic naphtha reforming testing product over the catalyst described in Example 5. The catalytic naphtha reforming experiment was carried out at 950° F., 150 psig, hydrocarbon WHSV of 2.2 and molar ratio of hydrogen to hydrocarbon of 3.0.

TABLE 5

| Component, in wt. % | Feed (Example 7) | Product (Example 8) |
|---|---|---|
| Methane | 0 | 0.8 |
| ethane | 0 | 1.6 |
| propane | 0 | 3.3 |
| iso-butane | 0 | 1.8 |
| n-butane | 0 | 3.3 |
| iso-pentane | 0 | 1.4 |
| n-pentane | 0 | 2.4 |
| cyclopentane | 0 | 0 |
| iso-hexanes | 0.5 | 1.9 |
| n-hexane | 1.5 | 2.8 |
| C6 naphthenes | 2.5 | 0.2 |
| benzene | 0 | 2.0 |
| iso-heptanes | 1.2 | 12.3 |
| n-heptane | 7.2 | 4.7 |
| C7 naphthenes | 4.7 | 3.1 |
| toluene | 5.6 | 17.4 |
| iso-octanes | 31.3 | 9.8 |
| n-octane | 13.1 | 1.7 |
| C8 naphthenes | 4.3 | 1.2 |
| ethylbenzene | 1.4 | 3.6 |
| xylenes | 5.7 | 14.8 |
| heavier paraffins and naphthenes | 20.1 | 5.1 |
| heavier aromatics | 0.9 | 4.8 |

The product in Table 5 shows an increase in aromatics and octane gasoline. The boron-SSZ-41 successfully reformed the feedstock of Example 7.

As used in this disclosure the word "comprises" or "comprising" is intended as an open-ended transition meaning the inclusion of the named elements, but not necessarily excluding other unnamed elements. The phrase "consists essentially of" or "consisting essentially of" is intended to mean the exclusion of other elements of any essential significance to the composition. The phrase "consisting of" or "consists of" is intended as a transition meaning the exclusion of all but the recited elements with the exception of only minor traces of impurities.

All patents and publications referenced herein are hereby incorporated by reference to the extent not inconsistent herewith. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise that as specifically described without actually departing from the spirit and scope of the present invention as defined by the appended claims.

What is claimed is:

1. A molecular sieve having in its as-synthesized form having the peaks below:

| 2-Theta [°] | d-Spacing [Å] | Relative Intensity [100 × I/Io] |
|---|---|---|
| 6.71 | 13.16 | S |
| 9.52 | 9.28 | W |
| 20.00 | 4.436 | VS |
| 21.40 | 4.149 | VS |
| 22.19 | 4.003 | S – VS |
| 23.22 | 3.828 | S |
| 24.45 | 3.638 | S – VS |
| 26.07 | 3.415 | M – S |
| 28.01 | 3.183 | M |
| 35.52 | 2.525 | M | with boron and zinc in the framework.

2. The molecular sieve of claim 1, and having a composition comprising the molar relationship:

$$B_2O_3:(n)(SiO_2)$$

wherein n is ≥10.

3. The molecular sieve of claim 1, and having a composition comprising the molar relationship:

$$B_2O_3:(n)(SiO_2)$$

wherein n is ≥15.

4. The molecular sieve of claim 2, wherein n ranges from about 15 to 20.

5. The molecular sieve of claim 1, having a chemical composition comprising the following molar relationship:

| $SiO_2/B_2O_3$ | ≥10 |
|---|---|
| $SiO_2/Al_2O_3$ | ≥300 |
| $SiO_2/ZnO$ | 15 to 75 |
| $Q/SiO_2$ | >0 to 0.1 | wherein Q comprises 1,1'-(1,4-butanediyl)bis[4-aza-1-azoniabicyclo[2.2.2]octane]dications.

6. The molecular sieve of claim 5, wherein the molecular sieve has a chemical composition comprising the following molar relationship

| $SiO_2/B_2O_3$ | ≥15 |
|---|---|
| $SiO_2/Al_2O_3$ | ∞ (no Al) |

-continued

| | |
|---|---|
| SiO$_2$/ZnO | 20 to 40 |
| Q/SiO$_2$ | >0 to 0.1 | wherein Q comprises 1,1'-(1,4-butanediyl)bis[4-aza-1-azoniabicyclo[2.2.2]octane]dications.

7. The molecular sieve of claim 1 having in its calcined form at least the following peaks:

| 2-Theta [°] | d-Spacing [Å] | Relative Intensity [100 × I/Io] |
|---|---|---|
| 6.82 | 12.95 | VS |
| 9.64 | 9.17 | M – S |
| 20.14 | 4.41 | VS |
| 21.55 | 4.12 | S |
| 22.35 | 3.97 | M |
| 23.38 | 3.80 | M |
| 24.64 | 3.61 | M |
| 26.24 | 3.39 | M |
| 28.18 | 3.16 | M |
| 35.70 | 2.51 | W | with boron and zinc in the framework.

* * * * *